United States Patent
Tomiyama

(10) Patent No.: US 8,752,685 B2
(45) Date of Patent: Jun. 17, 2014

(54) LOCK-UP DEVICE FOR TORQUE CONVERTER

(75) Inventor: Naoki Tomiyama, Hirakata (JP)

(73) Assignee: EXEDY Corporation, Osaka (JP)

( * ) Notice: Subject to any disclaimer, the term of this patent is extended or adjusted under 35 U.S.C. 154(b) by 51 days.

(21) Appl. No.: 13/575,979

(22) PCT Filed: Feb. 2, 2011

(86) PCT No.: PCT/JP2011/052148
§ 371 (c)(1),
(2), (4) Date: Jul. 30, 2012

(87) PCT Pub. No.: WO2011/105182
PCT Pub. Date: Sep. 1, 2011

(65) Prior Publication Data
US 2012/0292150 A1    Nov. 22, 2012

(30) Foreign Application Priority Data

Feb. 26, 2010 (JP) .................................. 2010-041294
Feb. 26, 2010 (JP) .................................. 2010-041295

(51) Int. Cl.
*F16H 45/02* (2006.01)

(52) U.S. Cl.
USPC ........................................ 192/3.29; 192/213

(58) Field of Classification Search
USPC ............................ 192/3.29, 212, 213, 55.61
See application file for complete search history.

(56) References Cited

U.S. PATENT DOCUMENTS

| 4,987,980 | A | * | 1/1991 | Fujimoto | 192/3.28 |
| 5,540,620 | A | * | 7/1996 | Haneda et al. | 464/64.1 |
| 5,882,264 | A | * | 3/1999 | Yabe et al. | 464/64.1 |
| 5,941,354 | A | * | 8/1999 | Fukushima et al. | 192/3.28 |
| 6,199,675 | B1 | * | 3/2001 | Fujimoto et al. | 192/3.29 |
| 7,743,900 | B2 | * | 6/2010 | Breier | 192/213 |
| 2005/0211522 | A1 | * | 9/2005 | Doi et al. | 192/3.29 |
| 2007/0205070 | A1 | * | 9/2007 | Bauer et al. | 192/55.61 |

FOREIGN PATENT DOCUMENTS

| JP | 2000-310282 A | 11/2000 |
| JP | 2002-70949 A | 3/2002 |
| JP | 2002-089657 A | 3/2002 |
| JP | 2002-106639 A | 4/2002 |
| JP | 2007-247722 A | 9/2007 |
| JP | 2008-138797 A | 6/2008 |
| WO | WO-2006-114236 A1 | 11/2006 |

* cited by examiner

Primary Examiner — Richard M. Lorence
Assistant Examiner — Lillian Nguyen
(74) Attorney, Agent, or Firm — Global IP Counselors, LLP

(57) ABSTRACT

The lock-up device includes an input rotary member, an output rotary member, an elastic member and a support member. The elastic member elastically couples the input rotary member and the output rotary member in a rotational direction. The support member is rotatably disposed relatively to the input rotary member and the output rotary member. The support member has a support part supporting the elastic member and an engaging part engaged with the elastic member in the rotational direction. The support part of the support member herein has an outer peripheral side support portion supporting the outer peripheral side of the elastic member. Further, the outer peripheral end of the outer peripheral side support portion has a curvature continuously reduced in proportion to distance from the engaging part in the rotational direction.

10 Claims, 7 Drawing Sheets (a) V₁-V₁

(b) V₂-V₂

(c) V₃-V₃

(d) V₄-V₄

LOCK-UP DEVICE FOR TORQUE CONVERTER

CROSS-REFERENCE TO THE RELATED APPLICATIONS

This U.S. national phase application claims priority to Japanese Patent Application Nos. 2010-041294 and 2010-041295, both of which were filed on Feb. 26, 2010. The entire disclosure of Japanese Patent Application Nos. 2010-041294 and 2010-041295 is hereby incorporated herein by reference.

BACKGROUND

1. Technical Field

The present invention relates to a lock-up device, particularly to a lock-up device for a torque converter to transmit torque, and simultaneously, absorb and attenuate torsional vibration.

2. Background Art

In many instances, torque converters include a lock-up device for directly transmitting torque from a front cover to a turbine. The lock-up device includes a piston, a retaining plate, a plurality of pairs of torsion springs, a driven plate, and a support member. The piston can be frictionally coupled to the front cover. The retaining plate is fixed to the piston. The torsion springs are supported by the retaining plate. The driven plate is elastically coupled to the piston through the torsion springs in a rotational direction. The support member is disposed while being rotatable relatively to the piston and the driven plate. It should be noted that the driven plate is herein fixed to the turbine (see Patent Literatures 1 and 2). The piston herein axially divides the space between the front cover and the turbine. Torque of the front cover is configured to be transmitted to the lock-up device when a friction facing annularly attached to the outer peripheral part of the piston is pressed onto a friction surface of the front cover. Accordingly, torque is transmitted from the lock-up device to the turbine. Fluctuation in torque to be inputted from an engine is herein absorbed and attenuated by a plurality of torsion springs disposed in the outer peripheral part of the lock-up device. It should be noted that the plural torsion springs are supported by the support member while a torque converter is thus actuated.

Japan Laid-open Patent Application Publication No. JP-A-2002-089657 (Patent Citation 1) is an example of the related art. Japan Laid-open Patent Application Publication No. JP-A-2008-138797 (Patent Citation 2) is another example of the related art.

SUMMARY

Technical Problems

The lock-up device described in Patent Literature 1 (hereinafter referred to as a well-known lock-up device) includes the support member. The support member has pawl portions for support and notches. Each pawl portion for support is disposed between torsion springs of each pair disposed in series. The notches serve to assemble the retaining plate (i.e., a drive member) to the support member. The retaining plate has pawl portions for compression. The pawl portions for compression make contact with the ends of the torsion springs for compressing the torsion springs in a circumferential direction. The retaining plate is assembled to the support member by inserting the pawl portions for compression into the notches of the support member. With the structure, each pair of torsion springs is compressed by the pawl portions for compression in the circumferential direction while each pawl portion for support is disposed between the torsion springs of each pair.

In the well-known lock up device, the retaining plate could have been thus easily assembled to the support member by forming the notches in the support member. In the well-known lock-up device, however, it is possible that stress is concentrated on the notch regions of the support member by each pair of torsion springs when centrifugal force is generated. Therefore, it has been difficult for the well-known structure to utilize heavyweight torsion springs. Especially when torsion springs in each pair have different weights, this has remarkably affected the aforementioned drawback.

It should be herein noted that in daring to utilize heavy weight torsion springs, the aforementioned drawback has been handled by increasing the plate thickness of the support member. In this case, however, another drawback is produced anew that the weight of the lock-up device is increased. In the lock-up device described in Patent Literature 2, on the other hand, torsional characteristics of a plurality of pairs of torsion springs are determined based on torsional characteristics of one pair of torsion springs when the plurality of pairs of torsion springs are compressed. In other words, it is required to set torsional characteristics of one pair of torsion springs for determining torsional characteristics of the plurality of pairs of torsion springs.

Torsional characteristics indicate a relation between the torsional angle (i.e., the rotational angle) of one pair of torsion springs and the torque fluctuation amount that can be attenuated by a pair of torsion springs. Therefore, when one pair of torsion springs is compressed, torque fluctuation corresponding to torsional stiffness of one pair of torsion springs is attenuated. In the well-known lock-up device, torsional characteristics have linear characteristics. Therefore, it has been inevitable to increase torsional stiffness in order to attenuate predetermined torque fluctuation using torsional characteristics. However, vibration attributed to the torsion springs can be generated when torsional stiffness is increased too much.

Therefore, a configuration of setting torsional characteristics to have bilinear characteristics was devised for solving the aforementioned drawback. The configuration of setting torsional characteristics to have bilinear characteristics can inhibit vibration attributed to the torsion springs, compared to the configuration of setting torsional characteristics to have linear characteristics. However, a drawback has been arisen because vibration attributed to the torsion springs can not be completely inhibited even by a first torsional stiffness of bilinear torsional characteristics when the target attenuation amount of torque fluctuation is increased.

When a large amount is set as the target attenuation amount of torque fluctuation, on the other hand, initial vibration can be inhibited by setting the first torsional stiffness of bilinear torsional characteristics to be small for inhibiting vibration attributed to the torsion springs. However, it is herein required to set a second torsional stiffness to be large for reliably achieving the target attenuation amount. Therefore, a ratio of the second torsional stiffness with respect to the first torsional stiffness is herein increased. Accordingly, vibration can be generated anew in a range of torsional characteristics greater than or equal to its bent point. In other words, even in this case, a drawback has been arisen because vibration attributed to the torsion springs can not be completely inhibited.

The present invention has been produced in view of the aforementioned drawback. It is an advantage of the present invention to provide a flexibly designable lock-up device for a torque converter. It is another advantage of the present invention to produce a lightweight lock-up device for a torque converter. It is yet another advantage of the present invention to provide a lock-up device for a torque converter for reliably inhibiting vibration attributed to coil springs.

Solution to the Problems

A lock-up device for a torque converter according to a first aspect of the invention is a device for transmitting torque and simultaneously absorbing and attenuating torsional vibration. The lock-up device includes an input rotary member, an output rotary member, an elastic member and support member. The elastic member serves to elastically couple the input rotary member and the output rotary member in a rotational direction. The support member is rotatably disposed relatively to the input rotary member and the output rotary member. The support member includes a support part and an engaging part. The support part supports the elastic member. The engaging part is integrally formed with the support part and is engaged with the elastic member in the rotational direction. Here, the support part has an outer peripheral side support portion supporting an outer peripheral side of the elastic member. Further, an outer peripheral end of the outer peripheral side support portion has a curvature continuously reduced in proportion to distance from the engaging part in the rotational direction.

According to the present lock-up device, torque of the engine is transmitted form the input rotary member to the output rotary member. When torsional vibration is herein generated, the elastic member absorbs and attenuates the torsional vibration while being engaged with the engaging part of the support member and being supported by the support part of the support member. In the lock-up device as described above, the curvature of the outer peripheral end of the outer peripheral side support portion of the support member is continuously reduced in proportion to distance from the engaging part in the rotational direction. Therefore, it is possible to reduce stress concentration that can be generated in the support member during actuation of the elastic member. Especially, it is not required for the present lock-up device to form a discontinuous portion such as a notch in the support member. Therefore, it is possible to remarkably reduce stress concentration that can be generated in the support member, compared to the well-known lock-up device. Thus, the present lock-up device can reduce stress concentration that can be generated in the support member. Therefore, the present lock-up device can be flexibly designed by a variety of combinations of the elastic members.

Further, the present lock-up device can reduce stress concentration that can be generated in the support member. Therefore, the plate thickness of the support member can be reduced in the present lock-up device, compared to the well-known lock-up device. Accordingly, it is possible to achieve weight reduction of the lock-up device. It should be noted that the present lock-up device can be easily assembled due to a curvature reduced part of the outer peripheral end of the outer peripheral side support portion of the support member. In other words, the present lock-up device can be easily assembled even without forming a notch for assembling unlike the well-known lock-up device.

A lock-up device for a torque converter according to a second aspect of the invention relates to the device according to the first aspect. In the lock-up device, the outer peripheral end of the outer peripheral side support portion is formed in a planar shape in a rotation-directionally middle part of the outer peripheral side support portion. In this case, the outer peripheral end of the outer peripheral side support portion is formed in a planar shape in the rotation-directionally middle part of the outer peripheral side support portion. Therefore, it is possible to reliably reduce stress concentration that can be generated in the support member during actuation of the elastic member. Thus, the present lock-up device can reduce stress concentration that can be generated in the support member. Therefore, the present lock-up device can be flexibly designed by a variety of combinations of the elastic members. Further, the present lock-up device can also achieve the aforementioned other advantageous effects.

It should be noted that after molding of the support member is completed, it is required to remove molds from the support member. In this case, the molds can be easily removed from the support member by forming the outer peripheral end of the rotation-directionally middle part of the outer peripheral side support portion in a planar shape. A lock-up device for a torque converter according to a third aspect of the invention relates to the device according to one of the first and second aspects. In the lock-up device, the support part of the support member further includes a lateral surface support portion supporting a lateral surface of the elastic member. The lateral surface support portion is disposed between the input rotary member and the elastic member.

In this case, the lateral surface support portion is disposed between the input rotary member and the elastic member. Therefore, the lateral surface support portion is not easily buckled, and strength of the support member can be thereby enhanced. Accordingly, the present lock-up device can be flexibly designed by a variety of combinations of the elastic members. Further, the plate thickness of the support member can be reduced in the present lock-up device, compared to the well-known lock-up device. Accordingly, it is possible to achieve weight reduction of the lock-up device. Yet further, the present lock-up device can also achieve the aforementioned other advantageous effects.

A lock-up device for a torque converter according to a fourth aspect of the invention relates to the device according to one of first, second, and third aspects. In the lock-up device, the support part of the support member further includes an inner peripheral side extended portion extending in a direction away from an inner peripheral side of the elastic member. The inner peripheral side extended portion is a portion that is curved towards the elastic member from the lateral surface support portion and extends in a direction away from the inner peripheral side of the elastic member. In this case, the inner peripheral side extended portion is not easily buckled due to the portion curved towards the elastic member from the lateral surface support portion. Therefore, strength of the support member can be enhanced. Further, the inner peripheral side extended portion extends in the direction away from the inner peripheral side of the elastic member. Therefore, it is possible to increase radial bending stiffness of the support member. Accordingly, the present lock-up device can be flexibly designed by a variety of combinations of the elastic members. Yet further, the plate thickness of the support member can be reduced in the present lock-up device, compared to the well-known lock-up device. Therefore, it is possible to achieve weight reduction of the lock-up device. Furthermore, the present lock-up device can also achieve the aforementioned other advantageous effects.

A lock-up device for a torque converter according to a fifth aspect of the present invention relates to the device according to one of the first to fourth aspects. In the lock-up device, the engaging part of the support member includes a curved portion and locking portions. The locking portions are locked with the elastic member in the rotational direction. The locking portions are formed by inwardly bending both ends of the curved portion. In this case, the engaging part of the support member includes the locking portions formed by inwardly bending the both ends of the curved portion. Therefore, the elastic member can be reliably locked with the locking portions. Further, the locking portions are formed by inwardly bending the both ends of the curved portion. Therefore, the locking portions are not easily buckled. Accordingly, strength of the support member can be enhanced. In addition, it is possible to increase radial bending stiffness of the locking portions. Therefore, the present lock-up device can be flexibly designed by a variety of combinations of the elastic members. Yet further, the plate thickness of the support member can be reduced in the present lock-up device, compared to the well-known lock-up device. Accordingly, it is possible to achieve weight reduction of the present lock-up device. Moreover, the present lock-up device can also achieve the aforementioned other advantageous effects.

A lock-up device for a torque converter according a sixth aspect of the present invention relates to the device according to one of the first to fifth aspects. In the lock-up device, the elastic member includes a plurality of pairs of first coil springs and a plurality of pairs of second coil springs. The first coil springs are configured to be compressed in the rotational direction by relative rotation between the input rotary member and the output rotary member. The first coil springs of each pair are disposed in series. Each second coil spring has a length shorter than a length of each first coil spring and is disposed in an inner periphery of each first coil spring.

In the lock-up device, torque of the engine is transmitted from the input rotary member to the output rotary member. When torsional vibration is herein generated, the torsional vibration is absorbed and attenuated by the plural pairs of the first coil springs and the plural pairs of the second coil springs. In this case, when compression of the first coil springs of each pair is firstly started, torsional vibration is absorbed and attenuated in accordance with the torsional stiffness of the first coil springs of each pair (first-stage torsional characteristics). When compression of the first coil springs of each pair and that of the second coil springs of each pair are then started, torsional vibration is absorbed and attenuated in accordance with the torsional stiffness of the first coil springs of each pair and that of the second coil springs of each pair (second-stage torsional characteristics). Finally, while the first coil springs of each pair and the second coil springs of each pair are compressed, at least either of: any one of the first coil springs of each pair; and the second coil spring disposed in the inner periphery of this first coil spring is prevented from being compressed for absorbing and attenuating torsional vibration in accordance with a torsional stiffness of compressible one of the first coil springs and that of compressible one of the second coil springs (third-stage torsional characteristics).

According to the present lock-up device, it is possible to set torsional characteristics to be of a multi-stage (i.e., trilinear) type. According to the present lock-up device, torsional stiffness can be set to be gradually increased by thus setting torsional characteristics to be of a trilinear type. Especially, torsional stiffness of the first stage can be set to be small. Therefore, it is possible to inhibit vibration that can be generated when the torsional angle is small.

Further, according to the present lock-up device, torsional characteristics are set to be of a trilinear type, and therefore, a ratio of torsional stiffness, for instance, a ratio of second torsional stiffness to first torsional stiffness (N2/N1) and a ratio of third torsional stiffness to the second torsional stiffness (N3/N2) can be set to be small compared to the case that torsional characteristics are set to be of a bilinear type. Accordingly, it is possible to inhibit vibration to be generated when each bent point is exceeded in torsional characteristics.

Yet further, according to the present lock-up device, torsional stiffness of the third stage is formed by preventing compression of at least either of: any one of the first coil springs of each pair; and the second coil spring disposed in the inner periphery of this first coil spring. Therefore, trilinear torsional characteristics can be set without changing the size of the lock-up device. In other words, trilinear torsional characteristics can be set without changing the size of the existing lock-up device.

It should be noted that trilinear torsional characteristics can be set regardless of the magnitude of the target attenuation amount of torque variation. Further, the aforementioned advantageous effects will be remarkable especially when the target attenuation amount of torque variation is large. A lock-up device for a torque converter according to a seventh aspect of the present invention relates to the device according to the sixth aspect. In the lock-up device, at least either of: any one of the first coil springs of each pair; and the second coil spring disposed in the inner periphery of this first coil spring is compressed while coiled portions thereof are closely contacted to each other for preventing compression of any one of the first coil springs of each pair and the second coil spring disposed in the inner periphery of this first coil spring.

In this case, under the condition that the first coil springs of each pair and the second coil springs of each pair are compressed, when at least either of: one of the first coil springs of each pair; and one of the second coil springs that is disposed in the inner periphery of this first coil spring is compressed while the coiled portions thereof are closely contacted to each other, the coil spring compressed while the coiled portions thereof are closely contacted to each other becomes no longer compressible and thereby does not contribute to torsional characteristics. Accordingly, torsional vibration is absorbed and attenuated in accordance with torsional stiffness of the compressible first spring and that of the compressible second coil spring (torsional characteristic of the third stage).

According to the present lock-up device, trilinear torsional characteristics can be set by compressing at least either of: one of the first coil springs of each pair; and the second coil spring disposed in the inner periphery of this first coil spring under the condition that the coiled portions of the compressed coil spring are closely contacted to each other. Thus, according to the present lock-up device, trilinear torsional characteristics can be easily set only by changing: the shape (e.g., the entire length of a coil spring, distance between coiled portions of a coil spring, etc.) of the first coil springs and that of the second coil springs; and torsional stiffness of the first coil springs and that of the second coil springs. Further, the present lock-up device can also achieve the aforementioned advantageous effects.

A lock-up device for a torque converter according to an eighth aspect of the present invention relates to the device according to the seventh aspect. In the lock-up device, the second coil springs of each pair have equal length. Further, any one of the second coil springs of each pair has a torsional stiffness different from a torsional stiffness of the other of the second coil springs of each pair. Yet further, either of the second coil springs of each pair is compressed while coiled portions thereof are closely contacted to each other for preventing compression of any one of the first coil springs and the second coil spring disposed in the inner periphery of this first coil spring.

In this case, when one of the second coil springs of each pair is compressed while the coiled portions thereof are closely contacted to each other under the condition that the first coil springs of each pair and the second coil springs of each pair are compressed, the second coil spring, which is compressed while the coiled portions thereof are closely contacted to each other, becomes no longer compressible and thereby does not contribute to torsional characteristics. Accordingly, torsional vibration is absorbed and attenuated in accordance with torsional stiffness of the compressible first coil spring and that of the compressible second coil spring (torsional characteristic of the third stage).

In the present lock-up device, trilinear torsional characteristics can be set by compressing one of the second coil springs of each pair under the condition that the coiled portions thereof are closely contacted to each other. According to the present lock-up device, trilinear torsional characteristics can be thus easily set only by changing: the shape (e.g., the entire length of a coil spring, distance between coiled portions of a coil spring, etc.) of the first coil springs and that of the second coil springs; and torsional stiffness of the first coil springs and that of the second coil springs. Further, the present lock-up device can also achieve the aforementioned advantageous effects.

A lock-up device for a torque converter according to a ninth aspect of the present invention relates to the device according to the eighth aspect. In the lock-up device, the plural first coil springs have equal torsional stiffness. Further, the respective second coil springs disposed in the inner peripheries of the plural first coil springs have a torsional stiffness less than a torsional stiffness of the respective first coil springs. In this case, torsional stiffness can be gently changed when the second coil springs contribute to torsional characteristics by: setting the plural first coil springs to have equal torsional stiffness; and setting the second coil springs disposed in the inner peripheries of the respective plural first coil springs to have torsional stiffness smaller than that of the first coil springs. In other words, it is possible to produce multi-stage characteristics that torsional stiffness does not acutely vary. Further, the lock-up device can also achieve the aforementioned advantageous effects.

A lock-up device for a torque converter according to a tenth aspect of the present invention relates to the device according to one of the first to ninth aspects. The lock-up device further includes a rotation restricting unit for restricting relative rotation between the input rotary member and the output rotary member. In this case, relative rotation between the input rotary member and the output rotary member is restricted by the rotation restricting unit. Accordingly, a damper action for absorbing and attenuating torsional vibration by the first and second coil springs is stopped. In other words, the upper limit of torsional characteristics of the third stage is set by the rotation restricting unit. With the upper limit of torsional characteristics of the third stage thus set by the rotation restricting unit, torque can be reliably transmitted from the input rotary member to the output rotary member when the torsional angle becomes greater than or equal to a predetermined angle. Further, the present lock-up device can also achieve the aforementioned advantageous effects.

DETAILED DESCRIPTION OF THE PREFERRED EMBODIMENTS

Figure 1:
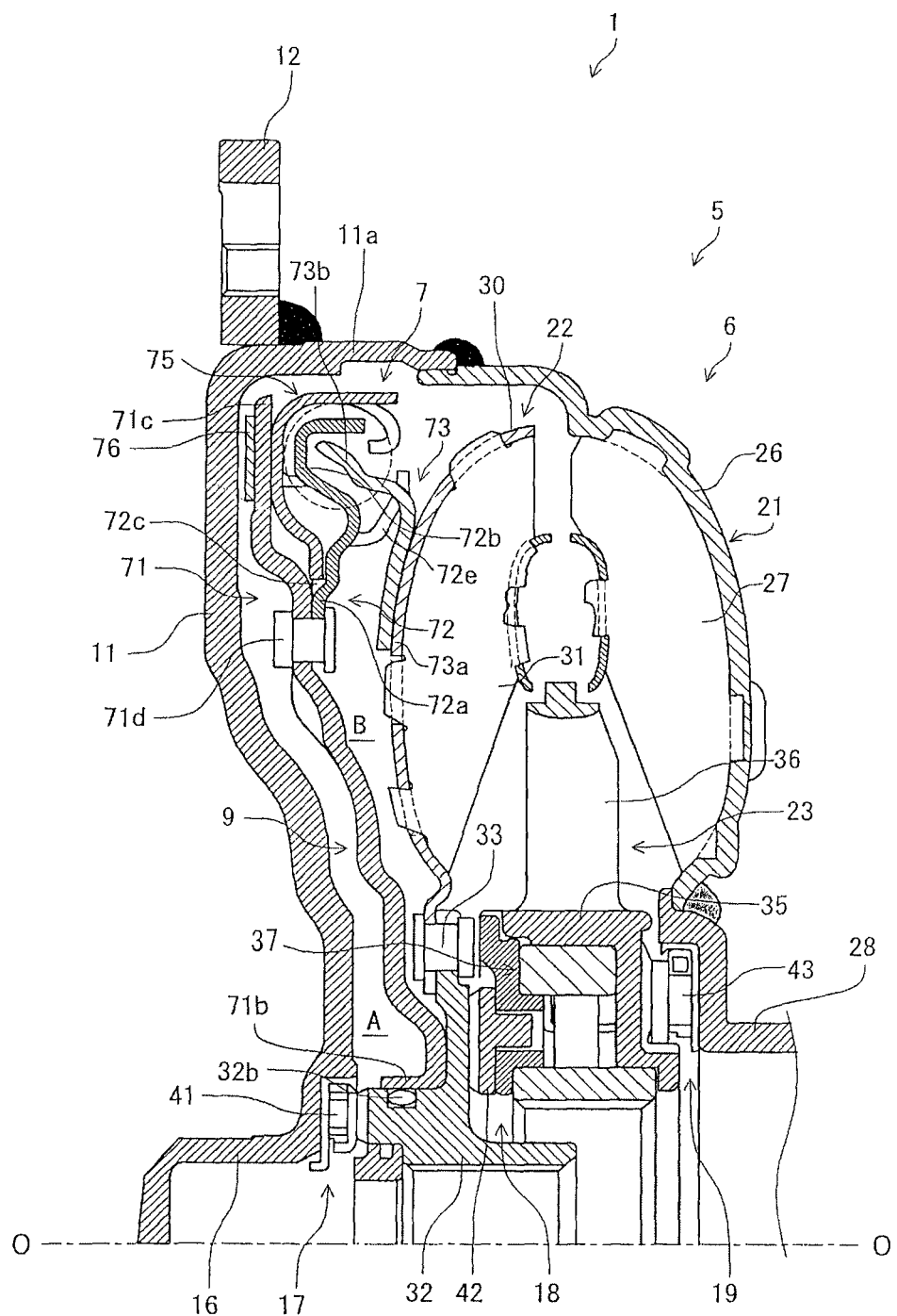
FIG. 1 is a partial cross-sectional view of a torque converter equipped with a lock-up device according to an exemplary embodiment of the present invention.
Figure 2:
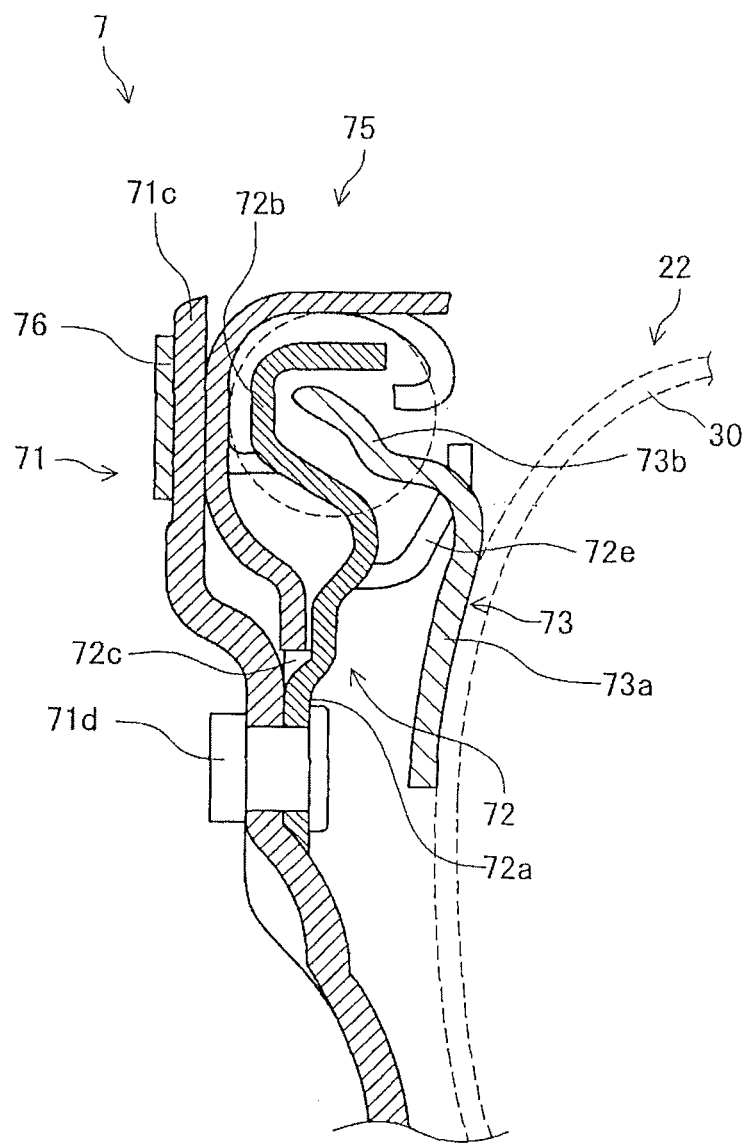
FIG. 2 is a partial cross-secitonal view of the lock-up device.
Figure 6:
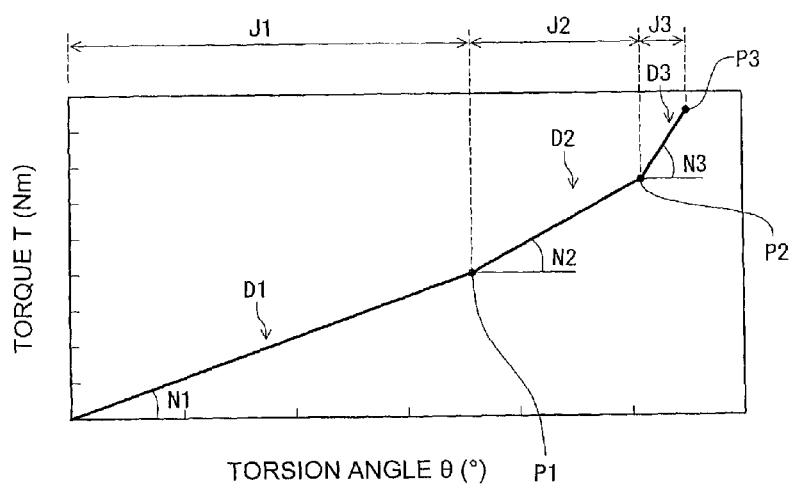
FIG. 6 is a chart representing trilinear torsional characteristics of the lock-up device.
Figure 7:
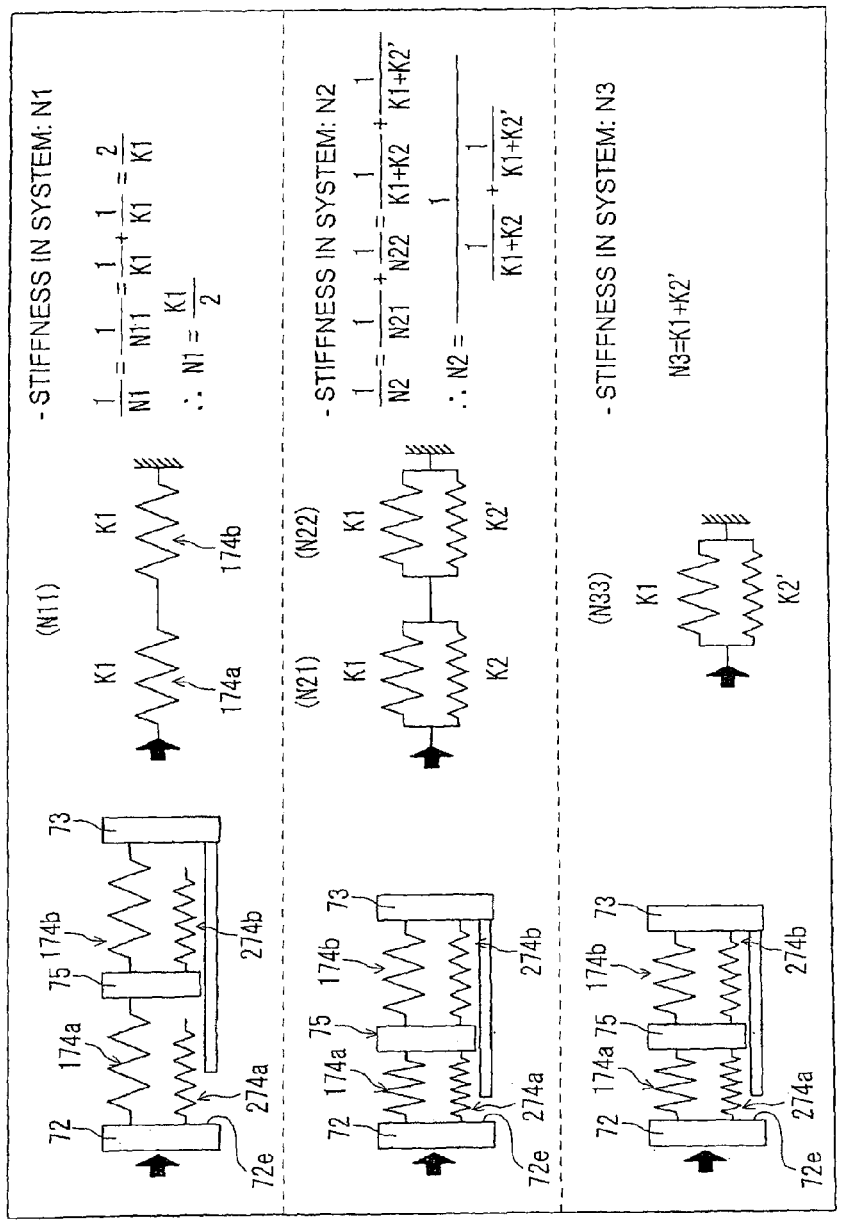
FIG. 7 includes model diagrams when torsion springs of the lock-up device are actuated.

FIG. 1 is a partial cross-sectional view of a torque converter 1 employing a lock-up device as an exemplary embodiment of the present invention. In FIG. 1, an engine (not illustrated in the figure) is disposed on the left side, while a transmission (not illustrated in the figure) is disposed on the right side. In FIG. 1, a line O-O indicates a rotary axis line of the torque converter and the lock-up device. FIG. 2 is a partial cross-sectional view of the lock-up device. FIG. 6 is a chart representing trilinear torsional characteristics when a pair of first torsion springs and a pair of second torsion springs are actuated. FIG. 7 includes model diagrams in respective stages of torsional characteristics when a pair of the first torsion springs and a pair of the second torsion springs are actuated.

Entire Structure of Torque Converter

FIG. 1 is a schematic vertical cross-sectional view of the torque converter 1 employing an exemplary embodiment of the present invention. The torque converter 1 is a device for transmitting torque from a crankshaft (not illustrated in the figure) of the engine to an input shaft (not illustrated in the figure) of the transmission. In FIG. 1, the engine (not illustrated in the figure) is disposed on the left side, while the transmission (not illustrated in the figure) is disposed on the right side. In FIG. 1, the line O-O is the rotary axis of the torque converter 1. Further, an arrow R1 indicates a drive side of the torque converter 1 in the rotational direction, while an arrow R2 indicates the opposite side of the driving side (see FIG. 3).

The torque converter 1 mainly includes a flexible plate (not illustrated in the figures) and a torque converter main body 5. The flexible plate is formed by a disc-shaped thin member. The flexible plate is a member for transmitting torque and absorbing bending vibration to be transmitted from the crankshaft to the torque converter main body 5. Therefore, the flexible plate has stiffness enough to transmit torque in the rotational direction but has low stiffness in a bending direction.

The torque converter main body 5 includes a front cover 11, a torus-shaped fluid actuation chamber 6 formed by three types of bladed wheels (i.e., an impeller 21, a turbine 22 and a stator 23) and a lock-up device 7. The front cover 11 is a disc-shaped member disposed adjacent to the flexible plate. The front cover 11 has a center boss 16 in the inner peripheral end thereof. The center boss 16 is a cylindrical member axially extending, and is inserted into a center hole of the crankshaft.

The inner peripheral part of the flexible plate is fixed to the tip surface of the crankshaft by means of a plurality of bolts. A plurality of nuts 12 are fixed to the outer peripheral side of the front cover 11 while being aligned at equal intervals in the circumferential direction. The outer peripheral part of the flexible plate is fixed to the front cover 11 by means of bolts screwed into the nuts 12. The front cover 11 includes an outer peripheral side tubular portion 11a in the outer peripheral part thereof. The outer peripheral side tubular portion 11a axially extends towards the transmission. The outer peripheral edge of an impeller shell 26 of the impeller 21 is fixed to the tip of the outer peripheral side tubular portion 11a by means of welding. As a result, the front cover 11 and the impeller 21 form a fluid chamber filled with operating oil. The impeller 21 is mainly formed by the impeller shell 26, a plurality of impeller blades 27 fixed to the inner side of the impeller shell 26, and an impeller hub 28 fixed to the inner peripheral part of the impeller shell 26.

The turbine 22 is disposed within the fluid chamber while being axially opposed to the impeller 21. The turbine 22 mainly includes a turbine shell 30, a plurality of turbine blades 31 fixed to the impeller-side surface of the turbine shell 30, and a turbine hub 32 fixed to the inner peripheral edge of the turbine shell 30. The turbine shell 30 and the turbine hub 32 are fixed to each other by means of a plurality of rivets 33.

The turbine hub 32 has a spline to be engaged with the input shaft on the inner peripheral surface thereof. With the structure, the turbine hub 32 is configured to be unitarily rotated with the input shaft. The stator 23 is a mechanism for regulating the flow of the operating oil to be returned from the turbine 22 to the impeller 21. The stator 23 is a member integrally fabricated by casting of resin, aluminum alloy or etc. The stator 23 is disposed between the inner peripheral part of the impeller 21 and the inner peripheral part of the turbine 22. The stator 23 is mainly formed by an annular stator shell 35 and a plurality of stator blades 36 disposed on the outer peripheral surface of the shell 35. The stator shell 35 is supported by a tubular stationary shaft (not illustrated in the figures) through a one-way clutch 37. The stationary shaft extends between the outer peripheral surface of the input shaft and the inner peripheral surface of the impeller hub 28.

The torus-shaped fluid actuation chamber 6 is formed within the fluid chamber by the aforementioned respective shells 26, 30 and 35 of the bladed wheels 21, 22 and 23. It should be noted that an annular space 9 is reliably produced between the front cover 11 and the fluid actuation chamber 6 within the fluid chamber. The one-way clutch 37 illustrated in the figure has a structure using a ratchet but can have a structure using rollers or sprags.

A first thrust bearing 41 is disposed axially between the inner peripheral part of the front cover 11 and the turbine hub 32. A first port 17 is formed in a part where the first thrust bearing 41 is disposed. The first port 17 allows the operating oil to pass therethrough in the radial direction. An oil path disposed within the input shaft, a first hydraulic chamber A (to be described) and the space between the turbine 22 and the front cover 11 are communicated to each other through the first port 17. Further, a thrust bushing 42 is disposed between the turbine hub 32 and the inner peripheral part of the stator 23 (especially, the one-way clutch 37). A second port 18 is formed in a part where the thrust bushing 42 is disposed. The second port 18 allows the operating oil to pass back and forth therethrough in the radial direction. In other words, the fluid actuation chamber 6 and an oil path between the input shaft and the stationary shaft are communicated to each other through the second port 18. Further, a second thrust bearing 43 is disposed axially between the stator 23 (especially, the shell 35) and the impeller 21 (especially, the impeller hub 28). A third port 19 is formed in a part where the second thrust bearing 43 is disposed. The third port 19 allows the operating oil to pass back and forth therethrough in the radial direction. In other words, the fluid actuation chamber 6 and an oil path between the stationary shaft and the impeller hub 28 are communicated to each other through the third port 19. It should be noted that the respective oil paths are connected to a hydraulic circuit (not illustrated in the figures) while being allowed to independently supply/discharge the operating oil to/from the first to third ports 17 to 19.

Structure of Lock-Up Device

Figure 3:
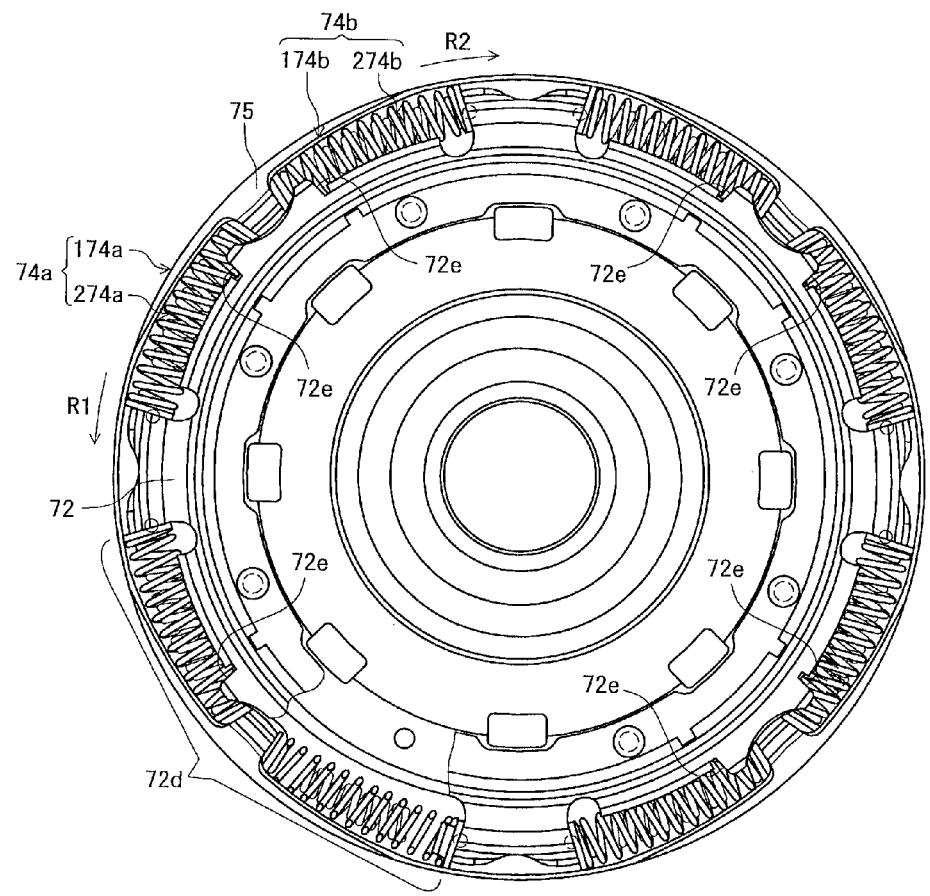
FIG. 3 is a front view of the lock-up device.

As illustrated in FIGS. 1 to 3, the lock-up device 7 is a mechanism for mechanically coupling the turbine 22 and the front cover 11 on an as-needed basis while being disposed in the space 9 between the turbine 22 and the front cover 11. The lock-up device 7 is disposed in a space produced axially between the front cover 11 and the turbine 22. The lock-up device 7 has an entirely disc shape and divides the space 9 in a roughly axial direction. In this case, the space produced between the front cover 11 and the lock-up device 7 is defined as the first hydraulic chamber A, while the space produced between the lock-up device 7 and the turbine 22 is defined as a second hydraulic chamber B.

The lock-up device 7 functions as a clutch and an elastic coupling mechanism and mainly includes a piston 71, a drive plate 72 (a retaining plate), a driven plate 73, a plurality of torsion springs 74a and 74b (first torsion springs 174 and second torsion springs 274), and a spring holder 75. It should be noted that in FIG. 3, corresponding reference numerals are given to only a pair of the torsion springs 74a and 74b, i.e., a pair of first torsion springs 174a and 174b and a pair of second torsion springs 274a and 274b.

The piston 71 is a member for coupling/decoupling the clutch, and further, functions as an input member in the lock-up device 7 functioning as an elastic coupling mechanism. The piston 71 is a disc-shaped member having a center hole. To divide the space 9 roughly in the axial direction, the piston 71 extends within the space 9 while roughly reaching the outer circumference of the space 9. The piston 71 has an inner peripheral side tubular portion 71b on the inner peripheral edge thereof. The inner peripheral side tubular portion 71b axially extends towards the engine. The inner peripheral side tubular portion 71b is supported by the engine-side outer peripheral surface of the turbine hub 32 while being movable in the rotational direction and the axial direction. It should be noted that the piston 71 makes contact with the transmission-side part of the turbine hub 32 and is thereby restricted from axially moving towards the transmission.

Further, the turbine hub 32 includes an annular seal ring 32b on the engine-side outer peripheral surface thereof. The seal ring 32b makes contact with the inner peripheral surface of the inner peripheral side tubular portion 71b. With the structure, axial sealing is achieved at the inner peripheral edge of the piston 71. Further, the piston 71 has a friction coupling portion 71c on the outer peripheral side thereof. The friction coupling portion 71c is an annular portion having a predetermined length in the radial direction. The friction coupling portion 71c is also formed in a planar shape so that both axial faces thereof can be arranged perpendicularly to the axial direction. An annular friction facing 76 is attached to the axially engine side of the friction coupling portion 71c. Thus, the clutch of the lock-up device 7 is formed by the piston 71 and the flat friction surface of the front cover 11. It should be noted that the piston 71 has no axially extended tubular portion and etc. on the outer peripheral edge thereof.

The drive plate 72 is disposed on the axially transmission side of the outer peripheral part of the piston 71. The drive plate 72 is an annular member made of sheet metal. The drive plate 72 has a fixation portion 72a and torque transmission portions 72b extending therefrom to the outer peripheral side. The fixation portion 72a makes contact with the axially transmission side face of the piston 71 while being fixed to the piston 71 by a plurality of swage rivets 71d. The torque transmission portions 72b extend from the fixation portion 72a to the outer peripheral side. More specifically, the torque transmission portions 72b extend from the inside to the outside in the radial direction while being smoothly curved for axially bulging towards the transmission, then smoothly curved for axially bulging towards the engine, and further axially extend towards the transmission. Further, the fixation portion 72a has a plurality of engaging portions 72e on the axially transmission side of the outer peripheral part thereof. The engaging portions 72e are further axially protruded towards the transmission than the other portions are.

A spring accommodation portion 72d is produced between adjacent two of the torque transmission portions 72b in the rotational direction. In the exemplary embodiment, four spring accommodation portions 72d are formed. In FIG. 3, the reference numeral 72d is assigned to only one of the spring accommodation portions. Each spring accommodation portion 72d accommodates the torsion springs 74a and 74b, which are coil springs extending in the circumferential direction. The torsion springs 74a and 74b are members for elastically coupling the piston 71 as an input member and the driven plate 73 as an output member in the rotational direction. Each pair of the torsion springs 74a and 74b are formed by the first torsion springs 174a and 174b and the second torsion springs 274a and 274b. When explained in detail, a pair of the first torsion springs 174a and 174b is disposed in each spring accommodation portion 72d while acting in series in the rotational direction. Further, the plural first torsion springs 274a and 274b are formed to have equal torsional stiffness. It should be herein noted that totally eight first torsion springs 174a and 174b are used as a whole.

The second torsion springs 274a and 274b are respectively disposed in the inner peripheries of a pair of the first torsion springs 174a and 174b disposed in each spring accommodation portion 72d. Specifically, the second torsion springs 274a and 274b are respectively disposed in the inner peripheries of the first torsion springs 174a and 174b while being movable in the rotational direction. As a whole, totally eight second torsion springs 274a and 274b are herein used.

It should be herein noted that the reference numerals "74a", "174a" and "274a" are assigned to the torsion springs disposed in the rotational direction R1 side in each spring accommodation portion 72d, while the reference numerals "74b", "174b" and "274b" are assigned to the torsion springs disposed in the rotational direction R2 side in each spring accommodation portion 72d. Further, the second torsion springs 274a and 274b are formed to have length shorter than that of the first torsion springs 174a and 174b. Further, the plural second torsion springs 274a and 274b are formed to have equal length.

Yet further, each pair of the second torsion springs 274a and 274b is formed so that one of each pair of the second torsion springs 274 and 274b can have torsional stiffness different from that of the other of each pair of the second torsion springs 274a and 274b. For example, each pair of the second torsion springs 274a and 274b is formed so that the second torsion spring 274a disposed on the rotational direction R1 side can have torsional stiffness less than that of the second torsion spring 274b disposed on the rotational direction R2 side.

A pair of torsion springs, which are formed by the first torsion spring 174a and the second torsion spring 274a, herein acts in parallel in the rotational direction. Further, a pair of torsion springs, formed by the first torsion spring 174b and the second torsion spring 274b, similarly acts in parallel in the rotational direction. Further, these two pairs of torsion springs act in series in the rotational direction.

The driven plate 73 is a member for transmitting torque from the torsion springs 74a and 74b to the turbine 22. The driven plate 73 is disposed on the outer peripheral side of the turbine shell 30 of the turbine 22. The driven plate 73 mainly has an attachment portion 73a and a plurality of pawls 73b. The attachment portion 73a is fixed to the turbine shell 30 by, for instance, welding. The plural pawls 73b are axially bent from the outer peripheral edge of the attachment portion 73a towards the engine. The claws 73b are opposed to the torque transmission portions 72b of the driven plate 72 while being respectively inserted from the axially transmission side into the torque transmission portions 72b that are axially curved in a convex shape towards the engine. Under the condition, each pawl 73b makes contact with the both rotation-directional ends of the first torsion springs 174a and 174b of each pair disposed in each spring accommodation portion 72d.

Further, the driven plate 73 has stopper pawls 73b. The stopper pawls 73b axially extend towards the engine from the inner peripheral edge of the attachment portion 73a. Each stopper pawl 73b is disposed between adjacent two of the engaging portion 72e of the drive plate 72. With the structure, compression of the torsion springs 74a and 74b (174a, 174b, 274a, 274b), i.e., a damper action is stopped when the drive plate 72 and the driven plate 73 are largely rotated relatively to each other and accordingly each stopper pawl 73b makes contact with either of the engaging portions 72e in the rotational direction. Thus, the engaging portions 72e of the drive plate 72 and the stopper pawls 73b of the driven plate 73 function as a rotation restricting unit. In other words, the rotation restricting unit is formed by the engaging portions 72e of the drive plate 72 and the stopper pawls 73b of the driven plate 73.

The spring holder 75 is a support member for supporting the torsion springs 74a and 74b. Specifically, the spring holder 75 is a member for supporting the torsion springs 74a and 74b in the radial direction. The spring holder 75 is disposed while being rotatable relatively to the piston 71 and the driven plate 73. Further, the spring holder 75 is disposed while being rotatable relatively to the drive plate 72 and the driven plate 73.

Figure 4:
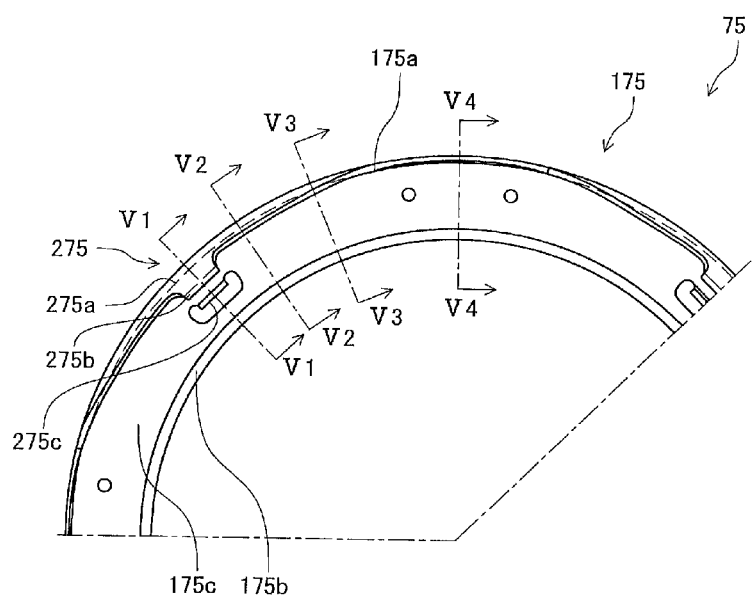
FIG. 4 is a partial external view of a spring holder of the lock-up device.
Figure 5:
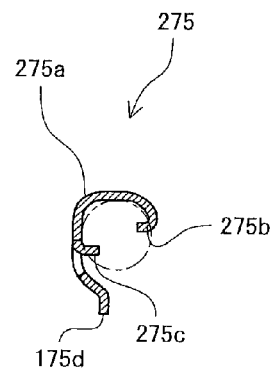
FIG. 5 includes cross-sectional views of the spring holder.
Figure 5:
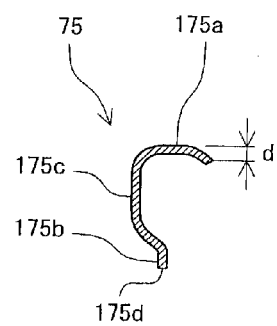
Figure 5:
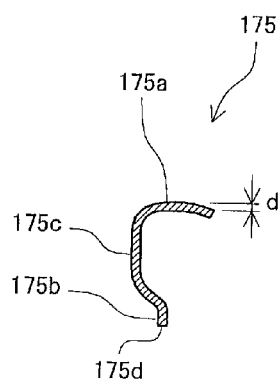
Figure 5:
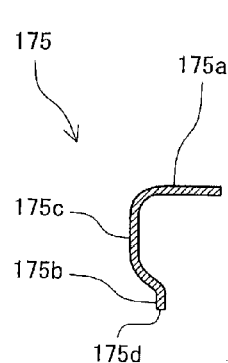

As illustrated in FIGS. 4 and 5, the spring holder 75 mainly includes a support part 175 and engaging parts 275. The support part 175 is a part for supporting the torsion springs 74a and 74b. The support part 175 has an outer peripheral side support portion 175a, an inner peripheral side extended portion 175b and a coupling portion (lateral surface support portion) 175c. The outer peripheral side support portion 175a axially extends in a tubular shape towards the transmission from the outer peripheral edge of the coupling portion 175c. The outer peripheral side support portion 175a is formed for continuously reducing curvature of the outer peripheral end thereof in proportion to distance from each engaging part 275 in the rotational direction. Further, each region of the outer peripheral side portion 175a, which is disposed between adjacent engaging parts 275, has a planar outer peripheral end in the rotation-directionally middle part thereof. In other words, the outer peripheral side support portion 175a is formed while a radial distance d, which is defined as a distance from the outer peripheral surface of the outer peripheral side support portion 175a to the tip of the outer peripheral end of the outer peripheral side support portion 175a, can be continuously reduced in proportion to distance from each engaging part 275 in the rotational direction.

For example, when each outer peripheral side support portion 175a is seen in the rotational direction as illustrated in FIG. 5, the outer peripheral end thereof has a curvature continuously reduced in proportion to distance from each engaging part 275 in the rotational direction (see FIGS. 5(b) to 5(c)). Further, the outer peripheral side support portion 175a has a planar outer peripheral end in each region thereof disposed between adjacent engaging parts 275 (see FIG. 5(d)). It should be noted that FIGS. 5(b), 5(c) and 5(d) correspond to a V2 cross-section of FIG. 4, a V3 cross-section of FIG. 4 and a V4 cross-section of FIG. 4, respectively.

The outer peripheral side support portion 175a structured as described above is disposed on the outer peripheral side of the first torsion springs 174a and 174b while being disposed closer thereto. The outer peripheral side support portions 175a support the outer peripheral side parts of the first torsion springs 174a and 174b. Further, the outer peripheral side support portion 175a is disposed on the further outer peripheral side of the tubular portions of the torque transmission portions 72b of the drive plate 72. Yet further, the outer peripheral side support portion 175a is disposed on the further outer peripheral side of the pawls 73b of the driven plate 73.

The inner peripheral side extended portion 175b is a portion extending radially inwards from the inner peripheral side of the first torsion springs 174a and 174b. When explained in detail, the inner peripheral side extended portion 175b is a portion curved towards the first torsion springs 174a and 174b from the inner peripheral edge of the coupling portion 175c and then extend in a direction away from the inner peripheral side of the first torsion springs 174a and 174b. In other words, the inner peripheral side extended portion 175b is a portion axially curved towards the transmission from the inner peripheral edge of the coupling portion 175c and then extends towards the input shaft.

The inner peripheral side extended portion 175b is disposed between the piston 71 and the drive plate 72. In other words, the inner peripheral side extended portion 175b, i.e., the inner peripheral side of the spring holder 75 is appropriately positioned by the piston 71 and the drive plate 72. When explained in detail, an engine-side protrusion 72c of the drive plate 72 is jointed (using a spigot ferrule) to the inner peripheral surface of the spring holder 75, for instance, a tip 175d of the inner peripheral side extended portion 175b. Thus, the spring holder 75 is appropriately positioned between the piston 71 and the drive plate 72.

The coupling portion 175c is a roughly disc-shaped portion disposed in contact with the axially transmission side surface of the friction coupling portion 71c of the piston 71. Further, the coupling portion 175c is disposed axially between the piston 71 and the first torsion springs 174a and 174b. Yet further, the coupling portion 175c is disposed axially between the piston 71 and the drive plate 72. When explained in detail, the coupling portion 175c is disposed axially between the friction coupling portion 71c of the piston 71 and the torque transmission portions 72b of the drive plate 72. Further, the coupling portion 175c is disposed axially between the piston 71 and the driven plate 73. When explained in detail, the coupling portion 175c is disposed axially between the piston 71 and the pawls 73b of the driven plate 73.

With the structure, the spring holder 75 can support the torsion springs 74a and 74b to be moved radially outwards by centrifugal force. The engaging parts 275 are parts to be engaged with the first torsion springs 174a and 174b in the rotational direction. The engaging parts 275 are integrally formed with the support part 175. Each engaging part 275 includes a curved portion 275a and locking portions 275b and 275c.

The curved portion 275a is a portion for coupling adjacent regions of the outer peripheral side support portion 175a and adjacent regions of the coupling portion 175c. The curved portion 275a is integrally formed with the outer peripheral side support portion 175a and the coupling portion 175c. The locking portions 275b and 275c are portions for locking the first torsion springs 174a and 174b in the rotational direction.

The locking portions 275b and 275c are formed by inwardly bending the both ends of the curved portion 275a. For example, the locking portion 275b is a pawl portion formed by axially bending the outer peripheral end of the curved portion 275a towards the engine. On the other hand, the locking portion 275c is a pawl portion formed by axially cutting and raising the inner peripheral end of the curved portion 275a towards the transmission. The locking portions 275b and 275c are disposed rotation-directionally between the first torsion springs 174a and 174b of each pair accommodated in each spring accommodation portion 72d.

The spring holder 75 structured as described above has a C-shaped vertical cross-section axially opened to one side. Further, the spring holder 75 functions as an intermediate float body. Torque is herein transmitted from the first torsion springs 174a and 174b to the spring holder 75 through the engaging parts 275 (e.g., the locking portions 275b and 275c). It should be noted that the spring holder 75 receives torque transmission from the second torsion springs 274a and 274b as well as the first torsion springs 174a and 174b when the second torsion springs 274a and 274b are compressed.

Actions of Torque Converter

Immediately after starting of the engine, the operating oil is supplied into the torque converter main body 5 through the first port 17 and the third port 19 and is discharged through the second port 18. The operating oil, which is supplied through the first port 17, flows through the first hydraulic chamber A to the outer peripheral side, then flows through the second hydraulic chamber B and flows into the fluid actuation chamber 6. Therefore, the piston 71 is axially moved towards the engine by the hydraulic difference between the first hydraulic chamber A and the second hydraulic chamber B. In other words, the friction facing 76 is separated away from the front cover 11 and the lock-up state is released. While the lock-up state is thus released, torque transmission between the front cover 11 and the turbine 22 is executed by the fluid drive between the impeller 21 and the turbine 22.

Actions of Lock-Up Device

When the speed ratio of the torque converter 1 is increased and the rotation speed of the input shaft reaches a predetermined speed, the operating oil is discharged from the first hydraulic chamber A through the first port 17. As a result, the piston 71 is moved towards the front cover 11 by the hydraulic difference between the first hydraulic chamber A and the second hydraulic chamber B, and the friction facing 76 is pressed onto the flat friction surface of the front cover 11. Consequently, torque of the front cover 11 is transmitted from the piston 71 to the driven plate 73 through the drive plate 72 and the torsion springs 74a and 74b. Further, torque is transmitted from the driven plate 73 to the turbine 22. In other words, the front cover 11 is mechanically coupled to the turbine 22 and torque of the front cover 11 is directly outputted to the input shaft through the turbine 22.

It should be noted that, when torsional vibration is thus inputted and the torsion springs 74a and 74b are repeatedly compressed, the torsion springs 74a and 74b are moved radially outwards by centrifugal force and slide along the outer peripheral side support portions 175a of the spring holder 75. However, the spring holder 75 is a member configured to be moved together with the torsion springs 74a and 74b in the rotational direction. Therefore, slide resistance is remarkably reduced between the both members and a torsional vibration attenuating performance is sufficiently exerted.

Torsional Vibration Attenuating Characteristics of Lock-Up Device

In the aforementioned lock-up coupling state, the lock-up device 7 transmits torque, and simultaneously absorbs and attenuates torsional vibration inputted thereto from the front cover 11. Specifically, when torsional vibration is inputted into the lock-up device 7 from the front cover 11 and a torsional angle θ is produced between the drive plate 72 and the driven plate 73 as represented in FIG. 6, the first torsion springs 174a and 174b are rotation-directionally compressed between the drive plate 72 and the driven plate 73. The state is referred to as a first compressed state J1. Specifically, the first torsion springs 174a and 174b are rotation-directionally compressed between the torque transmission portions 72b of the drive plate 72 and the pawls 73b of the driven plate 73. The spring holder 75 is herein compression-directionally moved by the torsion springs 74a and 74b and is rotated relatively to the drive plate 72 and the driven plate 73.

When the torsional angle θ is increased under the condition, each pair of the two second torsion springs 274a and 274b makes contact with the drive plate 72 and the driven plate 73. The state corresponds to a first bent point P1 in FIG. 6. Accordingly, the first torsion springs 174a and 174b of each pair and the second torsion springs 274a and 274b of each pair are rotation-directionally compressed between the drive plate 72 and the driven plate 73. The state is referred to as a second compressed state J2. Specifically, the first torsion springs 174a and 174b and the second torsion springs 274a and 274b are rotation-directionally compressed between the torque transmission portions 72b of the drive plate 72 and the pawls 73b of the driven plate 73. The spring holder 75 is herein compression-directionally moved by the torsion springs 74a and 74b and is rotated relatively to the drive plate 72 and the driven plate 73.

When the torsional angle θ is further increased under the condition, any one of each pair of the two second torsion springs 274a and 274b, i.e., the second torsion spring 274a having lower torsional stiffness, is compressed while the coiled portions thereof are closely contacted to each other. The state corresponds to a second bent point P2 in FIG. 6. When the second torsion spring 274a having lower torsional stiffness is herein compressed while the coiled portions thereof are closely contacted to each other, not only the second torsion spring 274a that the coiled portions thereof are closely contacted to each other, but also the first torsion spring 174a having the second torsion spring 274a in the inner periphery thereof becomes no longer compressible. Accordingly, the other of the two second torsion springs 274a and 274b of each pair (i.e., the second torsion spring 274b having higher torsional stiffness) and the first torsion spring 174b of each pair (i.e., the spring including the second torsion spring 274b in the inner periphery thereof) are rotation-directionally compressed between the drive plate 72 and the driven plate 73. The state is referred to as a third compressed state J3. Specifically, the first torsion spring 174b and the second torsion spring 274b are rotation-directionally compressed between adjacent torque transmission portions 72b of the drive plate 72 and between adjacent pawls 73b of the driven plate 73. The spring holder 75 is herein compression-directionally moved by the torsion springs 74a and 74b and is rotated relatively to the drive plate 72 and the driven plate 73.

When the torsional angle θ is further increased under the condition, the stopper pawls 73b of the driven plate 73 finally make contact with the engaging portions 72e of the drive plate 72. The state corresponds to a third bent point P3 in FIG. 6. Accordingly, compression of the actuating first torsion spring 174b of each pair and compression of the actuating second torsion spring 274b of each pair are stopped. The state is referred to as a compression stopped state P3. In other words, the damper actions of the torsion springs 74a and 74b (174a, 174b, 274a and 274b) are stopped.

Explanation will be hereinafter made regarding torsional characteristics when the torsion springs 74a and 74b (174a, 174b, 274a and 274b) are actuated as described above. It should be noted that explanation will be hereinafter made using torsional characteristics of a pair of the torsion springs 74a and 74b (174a, 174b, 274a and 274b) for easy explanation. As represented in FIGS. 6 and 7, in the first compressed state J1, torsional stiffness N11 (=1/{(1/K1+1/K1)}=1/(2/K1)) of the two first torsion springs 174a and 174b disposed in series is set as a torsional stiffness N1 in a system. Accordingly, a first gradient D1 of the torsional characteristic is set based on the torsional stiffness N1 in the system. Next, in the second compressed state J2, a torsional stiffness N2 in a system (=1/(1/N21+1/N22) 1/[1/{1/(K1+K2)}+1/{1/(K1+K2')}]) is set by synthesizing a torsional stiffness N21 (=K1+K2) of a pair of the first torsion spring 174a and the second torsion spring 274a disposed in parallel and a torsional stiffness N22 (=K1+K2'; K2<K2') of another pair of the first torsion spring 174b and the second torsion spring 274b disposed in parallel. Accordingly, a second gradient D2 of torsional characteristics is set based on the torsional stiffness N2 in the system. When the second torsion spring 274a is subsequently compressed while the coiled portions thereof are closely contacted to each other and the second compressed state J2 is thereby shifted to the third compressed state J3, a torsional stiffness N33 (=K1+K2') of a pair of the first torsion spring 174b and the second torsion spring 274b disposed in parallel is set as a torsional stiffness N3 in a system. Accordingly, a third gradient D3 of torsional characteristics is set based on the torsional stiffness N3 in the system. Trilinear torsional characteristics are thus set.

Finally, when the third compressed state J3 is shifted to the compression stopped state P3, the torsional angle θ of the torsional characteristics reaches the maximum torsional angle θ. When the torsional angle θ reaches the maximum torsional angle θ, torque will be the maximum torque in torsional characteristics. The torsional characteristics herein described relate to the torsional characteristics of one pair of the first torsion springs 174a and 174b and one pair of the second torsion springs 274a and 274b disposed radially inwards of the paired first torsion springs. Therefore, the torsional characteristic of the entire lock-up device 7 (i.e., the torsional characteristics of plural pairs of the first torsion springs 174a and 174b and plural pairs of the second torsion springs 274a and 274b) is set to be the torsional characteristics herein described.

Advantageous Effects of Torsional Vibration Attenuating Characteristics

In the present lock-up device 7, torsional characteristics can be set to be multi-staged torsional characteristics, i.e., trilinear torsional characteristics. With the setting of trilinear torsional characteristics, the torsional stiffness N1, the torsional stiffness N2 and the torsional stiffness N3, varying in accordance with the torsional angle θ, can be set to be gradually increased without acutely varying. Especially, it is possible to set the torsional stiffness N1 of the first stage to be small. It is thereby possible to inhibit vibration that can be generated when the torsional angle θ is small.

When explained in detail, in the present lock-up device 7, the setting of trilinear torsional characteristics makes it possible to set a ratio of torsional stiffness, for instance, a ratio of the second torsional stiffness to the first torsional stiffness (N2/N1) and a ratio of the third torsional stiffness to the second torsional stiffness (N3/N2), to be smaller than those in the setting of bilinear torsional characteristics. Accordingly, it is possible to inhibit vibration to be produced when each bent point is exceeded in the torsional characteristics.

Further, in the present lock-up device 7, the torsional stiffness of the third stage is formed by making the following springs no longer compressible: any one of the first torsion springs 174a and 174b of each pair; and at least one of the second torsion springs 274a and 274b disposed radially inwards of the first torsion springs. Therefore, trilinear torsional characteristics can be set without changing the size of the lock-up device.

Further, in the present lock-up device 7, trilinear torsional characteristics can be set by compression of either of the second torsion springs 274a and 274b of each pair that the coiled portions thereof are closely contacted to each other. Thus, in the present lock-up device 7, trilinear torsional characteristics can be easily set only by changing the shapes of the first torsion springs 174a and 174b and the second torsion springs 274a and 274b (the entire length of each torsion spring, distance between coiled portions of each torsion spring, etc.) and the torsional stiffness of the first torsion springs 174a and 174b and the second torsion springs 274a and 274b.

Further, in the present lock-up device 7, it is possible to gently change torsional stiffness when the second torsion springs 274a and 274b contribute to torsional characteristics by setting the plural first torsion springs 174a and 174b to have the same torsional stiffness and further setting the torsional stiffness of the second torsion springs 274 and 274b disposed respectively in the inner peripheries of the plural first torsion springs 174a and 174b to be less than that of the first torsion springs 174a and 174b. In other words, it is possible to form multi-stage characteristics that torsional stiffness does not acutely vary.

Yet further, in the present lock-up device 7, the upper limit of the torsional characteristics of the third stage is set by the rotation restricting units 72e and 73b. With the setting of the upper limit of the torsional characteristics of the third stage by the rotation restricting units 72e and 73b, it is possible to reliably transmit torque from the input side to the output side when the torsional angle θ becomes greater than or equal to a predetermined angle.

Advantageous Effects of Spring Holder

In the present spring holder 75, the curvature of the outer peripheral end of the outer peripheral side support portion 175a is continuously reduced in proportion to distance from each engaging part in the rotational direction. Therefore, it is possible to reduce stress concentration that can be generated in the spring holder 75 when centrifugal force is generated. Especially, the outer peripheral side support portion 175a has a planar outer peripheral end in the rotation-directionally middle part of each region thereof between adjacent engaging parts. It is thereby possible to reliably reduce stress concentration that can be generated in the spring holder 75 when centrifugal force is generated.

Further, in the present spring holder 75, the lock-up device 7 can be easily assembled due to a small curvature portion of the outer peripheral end of the outer peripheral side support portion 175a of the spring holder 75 and a planar portion of the rotation-directionally middle part of each area between engaging parts in the outer peripheral side support portion 175a. Further, in the present spring holder 75, the coupling portion 175c is disposed axially between the piston 71 and the torsion springs 74a and 74b. Therefore, the coupling portion 175c is prevented from being easily buckled and the strength of the spring holder 75 can be enhanced.

Further, in the present spring holder 75, the inner peripheral side extended portion 175b is prevented from being easily buckled due to a part curved towards the torsion springs 74a and 74b from the coupling portion 175c, and the strength of the spring holder 75 can be enhanced. Yet further, the inner peripheral side extended portion 175b extends in a direction away from the inner peripheral side of the torsion springs 74a and 74b. Therefore, it is possible to increase bending stiffness of the spring holder 75 in the radial direction.

Further, in the present spring holder 75, each engaging part 275 of the spring holder 75 include the locking portions 275b and 275c formed by inwardly bending the both ends of the curved portion 275a. Therefore, the torsion springs 74a and 74b can reliably lock the locking portions 275b and 275c. Yet further, the locking portions 275b and 275c are formed by inwardly bending the both ends of the curved portion 275a. Therefore, the locking portions 275b and 275c are prevented from being easily buckled, and the strength of the spring holder 75 can be enhanced. Moreover, it is possible to increase bending stiffness of the locking portions 275b and 275c in the radial direction.

Other Exemplary Embodiments (a) In the aforementioned exemplary embodiment, the case has been exemplified that the second compressed state J2 is shifted to the third compressed state J3 by compression of each second torsion spring 274a that the coiled portions thereof are closely contacted to each other. However, such shifting between compressed states can be implemented by compression of the first torsion springs 174a and 174b that the coiled portions thereof are closely contacted to each other. For example, the stiffness of either of the paired first torsion springs 174a and 174b is set to be different from that of the other of the paired first torsion springs 174a and 174b. Further, in the second compressed state J2, either of the paired first torsion springs 174a and 174b is compressed while the coiled portions thereof are closely contacted to each other. Accordingly, the compressed state can be shifted from the second compressed state J2 to the third compressed state J3. In other words, the third gradient D3 of torsional characteristics can be set. Even with the configuration, trilinear torsional characteristics can be set.

Advantageous Effects of the Invention

According to the present invention, it is possible to provide a lock-up device for a torque converter that can be flexibly designed. Further, according to the present invention, it is possible to reduce the weight of a lock-up device for a torque converter. Yet further, according to the present invention, it is possible to reliably inhibit vibration attributed to coil springs in a lock-up device for a torque converter.

INDUSTRIAL APPLICABILITY

The present invention can be used for a lock-up device of a torque converter to transmit torque and simultaneously absorb and attenuate torsional vibration.

The invention claimed is:

1. A lock-up device for a torque converter for transmitting torque and simultaneously absorbing and attenuating torsional vibration, the lock-up device comprising:
an input rotary member;
an output rotary member;
an elastic member being configured to couple the input rotary member and the output rotary member in a rotational direction; and
a support member rotatably disposed relatively to the input rotary member and the output rotary member, the support member including
- a support part supporting the elastic member, and
- an engaging part integrally formed with the support part, the engaging part engaged with the elastic member in the rotational direction, the support part including an outer peripheral side support portion being configured to support an outer peripheral side of the elastic member, the outer peripheral side support portion including an outer peripheral end which has a curvature, the curvature continuously becoming more reduced as being further away from the engaging part in the rotational direction.

2. The lock-up device for a torque converter recited in claim 1, wherein
the outer peripheral end of the outer peripheral side support portion is formed in a planar shape in a middle part in a rotation-directionally of the outer peripheral side support portion.

3. The lock-up device for a torque converter recited in claim 1, wherein
the support part further includes a lateral surface support portion supporting a lateral surface of the elastic member, and
the lateral surface support portion is disposed between the input rotary member and the elastic member.

4. The lock-up device for a torque converter recited in claim 1, wherein
the support part further includes an inner peripheral side extended portion extending in a direction away from an inner peripheral side of the elastic member, and
the inner peripheral side extended portion is curved towards the elastic member from the lateral surface support portion.

5. The lock-up device for a torque converter recited in claim 1, wherein
the engaging part includes a curved portion and locking portions,
the locking portions are locked with the elastic member in the rotational direction, and
the locking portions are formed by inwardly bending both ends of the curved portion.

6. The lock-up device for a torque converter recited in claim 1, wherein
the elastic member includes
first and second coil springs configured to be compressed in the rotational direction by relative rotation between the input rotary member and the output rotary member; and third and fourth coil springs, the third coil spring being disposed in the first spring, the fourth coil spring being disposed in the second coil spring, the third coil spring having a length shorter than a length of the first coil spring, the forth coil spring having a length shorter than a length of the second coil spring, the first and second coil springs being disposed in series, while the first coil spring and the third coil spring are compressed, at least one of: the first coil spring and the third coil spring being prevented from being compressed for absorbing and attenuating torsional vibration.

7. The lock-up device for a torque converter recited in claim 6, wherein
coiled portions of at least one of the first coil spring and the third coil spring is contacted to each other for preventing compression of the first coil spring and the third coil spring.

8. The lock-up device for a torque converter recited in claim 7,
wherein the third and fourth coil springs have equal length,
the third coil spring has a torsional stiffness different from a torsional stiffness of the fourth coil spring, and coiled portion of third coil spring is contacted to each other for preventing compression of the first coil spring and the third coil spring.

9. The lock-up device for a torque converter recited in claim 8, wherein
the first and second coil springs have equal torsional stiffness, and
the third and forth coil springs have a torsional stiffness less than a torsional stiffness of the first and second coil springs.

10. The lock-up device for a torque converter recited in claim 1, further comprising
a rotation restricting unit for restricting relative rotation between the input rotary member and the output rotary member.

* * * * *